Oct. 27, 1959  A. LACHMANN  2,910,389
BROWN SUGAR IN POWDERED FORM
Filed Dec. 2, 1955
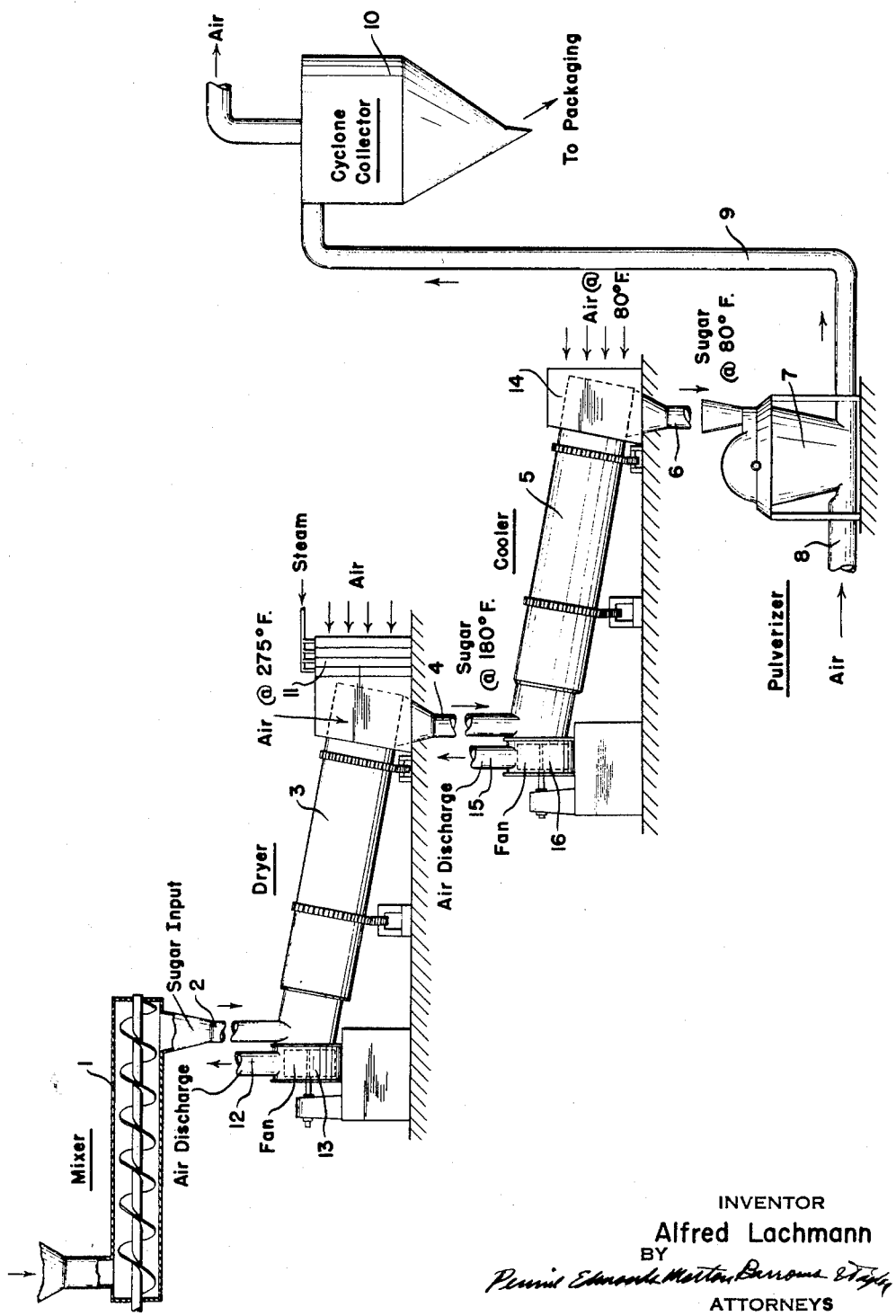
INVENTOR
Alfred Lachmann
BY
ATTORNEYS

United States Patent Office 2,910,389
Patented Oct. 27, 1959

2,910,389
BROWN SUGAR IN POWDERED FORM

Alfred Lachmann, Haddonfield, N.J., assignor to The American Sugar Refining Company, New York, N.Y., a corporation of New Jersey Application December 2, 1955, Serial No. 550,534

3 Claims. (Cl. 127—63)

This invention relates to an improved brown sugar product in powdered form, and includes the new product and the method of producing it.

The improved powdered brown sugar product of the present invention is made by drying granular brown sugar to convert the sticky molasses coating into a dry, non-sticky coating and pulverizing the dried granular product to break up the sugar crystals and the thin dry coating to form a finely pulverulent product of which most of the fine particles are made up of pulverized sugar crystals admixed with fine particles containing the disintegrated dry coating.

The dried pulverized brown sugar product thus produced in powdered form is a free flowing product which is non-caking and will not become sticky under fluctuating atmospheric conditions for long periods of time. The product has similar physical properties to those of confectioners' sugar, but has the characteristic flavor and taste of brown sugar. Due to its characteristic flavor, it is useful in making fudges and other confectionery, frostings, icings, cake mixes, cookie mixes, and other bakery goods, and for other purposes, where the flavor of brown sugar is desirable.

Commercial brown sugars are commonly marketed in a moist form. The handling of such sugars presents a number of problems to the industrial user as well as to the consumer. They are usually packaged in cartons or bags which are provided with moistureproof linings. As long as the bag or carton is closed, the brown sugar keeps its smooth texture. When a carton of brown sugar is opened and exposed to the air at room temperature, the sugar has a tendency to lose some of its moisture under certain climatic conditions, and during this drying out period, the brown sugar tends to cake and to harden. The hard lumps formed are difficult to disintegrate and present a number of handling and mixing problems to the industrial user and to the consumer.

Brown sugar contains, in addition to pure sucrose as its principal constituent, a coating of molasses which imparts the distinctive flavor and color to this type of sugar. The molasses, which is composed of sucrose, invert sugar, ash, water and other crystallizable and non-crystallizable compounds, surrounds the pure sucrose crystals in the form of a thin and sticky film. When brown sugar loses part of its moisture, by drying under certain atmospheric conditions, the thin film of molasses surrounding the sugar crystals increases in stickiness and cements the adjacent crystals together, thus forming a hard lump.

I have found that if granular brown sugar is properly dried to convert the sticky molasses film surrounding the sugar crystals into a dry, non-sticky, solid film or layer, and if the resulting dried granular brown sugar is then pulverized, a pulverulent product is produced in which the small amount of the dried, solid coating is buried up in fine microscopic pulverulent form in a radically larger amount of microscopic pulverulent sucrose crystal particles; and that the resulting pulverulent product has quite remarkable and unexpected stability and caking resistance.

The drying of the granular brown sugar can be carried out in different types of apparatus, but is advantageously carried out by drying with hot air and with agitation of the granular sugar during drying. Drying equipment such as the Hershey granulator can thus be used, and it is one advantage of the present process that the drying of the granular brown sugar can be carried out in available drying equipment.

The drying of the granular brown sugar with hot air at elevated temperatures may leave a dried coating which, while hot, is still soft or plastic, and it is important to complete the drying by cooling the dried product to a low temperature before it is discharged from the dryer and exposed to the surrounding atmosphere.

The pulverizing of the dried brown sugar can also be carried out in conventional grinding and pulverizing equipment, and the pulverizing can be carried to a point where products of different degrees of fineness are obtained, for example, products having a size comparable with 4-X or 6-X confectioners' sugar, or particles of even smaller, grit-free size, suitable for use in making fondants, etc.

The process of the present invention can be carried out with brown sugar alone, without any admixture before the drying and pulverizing treatment, and an improved pulverulent brown sugar product obtained.

A product of somewhat improved properties can be obtained by admixture with the dried sugar, before pulverizing, of a small amount of starch, around e.g. 1% to 5%; and a particularly valuable product can be obtained by admixture of such a small amount of starch with the brown sugar to coat it before it is dried.

A product of improved properties can also be obtained by coating the granular brown sugar with a coating of fine powdered sugar, such as a confectioners' sugar or the fine powdered brown sugar produced by the present invention, before the granular brown sugar is dried and pulverized.

An improved product can also be obtained by coating the granular brown sugar first with powdered sugar and then with a small amount of starch before drying.

When the granular brown sugar is first coated with powdered sugar or starch before drying, the drying is carried to the point where the molasses layer which is coated with the powdered sugar or starch is dried to a dry solid coating before subsequent pulverization to form the pulverized brown sugar product.

The invention will be further described in connection with the following examples, but it will be understood that the invention is not limited thereto.

In order to evaluate the caking resistance or resistance to moisture of the pulverized brown sugar product under controlled conditions, the following method was adopted of testing the caking resistance or resistance to moisture of the product:

The method was an accelerated method consisting in exposing 10 grams of the product to be tested in an open aluminum dish to a temperature of 85° F. and a relative humidity of 70%. The sample is slightly tilted during the experiment, in order to test its resistance toward flow. When the product starts to lose its free-flowing characteristics, which is observed by tilting the dish back and forth, the time of resistance to caking is recorded.

These conditions represent adverse atmospheric conditions and, if the product is free-flowing under these extremely unfavorable conditions for a long period of time, it is assumed that it will resist caking under normal fluctuating atmospheric conditions.

*Example 1.*—The drying of the granular brown sugar was carried out in a laboratory dryer which was a vacuum oven, and the product was dried for 4 hours at a temperature of 75° C. and at a vacuum of 14 inches. After 4 hours of drying, part of the product was removed, cooled to room temperature, and pulverized in a Mikro-Samplmill. A portion of the product was further dried for a total period of 8 hours.

The brown sugar used in this example had a sucrose content (polarization) of 88.7%, invert of 4.3%, moisture of 2.8%, ash of 2.0%, and undetermined, 2.2%. The product, dried for 4 hours and pulverized, had a moisture content of 0.9% and the product dried 8 hours had a moisture content of 0.04%.

Tested by the above caking resistance test to show resistance of the product to moisture, the original brown sugar with 2.8% moisture content showed no resistance. The product dried 4 hours and with a moisture content of 0.9% showed a resistance of 40 minutes, and the product dried for 8 hours and with a moisture content of 0.04% showed caking resistance of 60 minutes.

*Example 2.*—A laboratory rotary drum type dryer was used, through which hot air at a temperature of 136°–145° C. was passed and the sugar was dried for periods of 20, 40, 60 and 80 minutes with removal of samples at the end of each of these periods. The successive samples were removed and cooled, screened through a No. 10 Tyler mesh screen to remove oversize granules, and then pulverized in a laboratory Mikro-Samplmill.

The granular brown sugar used had the following analysis, sucrose (polarization) 88.5%; invert 3.6%; moisture 3.1%; ash 2.8%, undetermined 2.0%.

The product dried 20 minutes and then pulverized showed a moisture content of 1.67% and a resistance to moisture of 30–35 minutes. The product dried for 40 minutes and pulverized showed a moisture content of 1.30% and a resistance to moisture of 60 minutes. The product dried for 60 minutes showed a moisture content of 1.11% and a resistance to moisture of 60 minutes. The product dried 80 minutes and pulverized showed a moisture content of 1.07% and a resistance to moisture of 60–65 minutes.

In the above laboratory operation, the air was not dried but contained its normal moisture content.

The oversize granules removed by screening before pulverizing can be reprocessed, or used as an oversize granular product.

*Example 3.*—The brown sugar used and the method of drying and pulverizing was the same as that of Example 2, except that 3% of pulverized cornstarch was added to the dried granular sugar before it entered the pulverizer. When the resulting dried products were subjected to the above test for caking resistance, they showed the following somewhat improved resistance for the respective 20, 40, 60 and 80 minute dried products which were subsequently pulverized and tested:

| Drying time | Resistance to moisture, minutes |
|---|---|
| 20 minutes | 35–40 |
| 40 minutes | 65–70 |
| 60 minutes | 70 |
| 80 minutes | 75–80 |

*Example 4.*—The process was carried out with the same sugar and in the same manner described in Example 2, but with the addition to the brown sugar, before drying, of 3% powdered cornstarch. The brown sugar was mixed thoroughly with the starch in the rotary granulator for approximately 2–3 minutes before hot air was introduced. Every 20 minutes a sample of the material was removed. The air inlet temperature to the granulator was around 140° C. The samples removed after the successive drying periods, when pulverized and tested for resistance to moisture, showed the following results:

| Drying time | Moisture, percent | Resistance to moisture, minutes |
|---|---|---|
| 20 minutes | 1.75 | 40 |
| 40 minutes | 1.51 | 65 |
| 60 minutes | 1.33 | 90 |
| 80 minutes | 1.08 | 100 |

It will thus be seen, by comparing the moisture resistance obtained with Example 2, without the addition of starch, with results obtained in Example 4, with the addition of a small amount of starch before drying, that the addition of starch gave a materially improved moisture resistance.

Instead of adding starch in small amount, larger amounts of cornstarch or other starches can be used, as well as other additives such as tricalcium phosphate in small amount, e.g., around 1%, etc.

When powdered sugar such as confectioner's sugar is used for coating the granular brown sugar before drying, or where the pulverized brown sugar product produced by the process of the present invention is used for coating the granular brown sugar before drying, a somewhat larger amount of the powdered sugar is advantageously used sufficient to coat the molasses layer with the powdered sugar. The amount of powdered sugar may thus be around 5% to 10%, more or less, depending on the brown sugar coated. The use of powdered sugar has the advantage that the coated and dried pulverized product is made up entirely of sugar. And when powdered brown sugar is used for coating the granular brown sugar before drying and pulverizing, the resulting pulverized product is entirely a brown sugar product.

In addition to coating the granular brown sugar with powdered sugar before drying, a further coating of starch may also be applied to give a double coating layer on the molasses layer, first of added powdered sugar and second of added starch.

The carrying out of the process on a plant scale can advantageously be accomplished in such an apparatus as that illustrated conventionally in the accompanying drawing. In the apparatus illustrated, a mixer is indicated conventionaly at 1 for mixing the granular brown sugar with starch or other additive where this is to be incorporated in the sugar before drying. From the mixer 1, the sugar flows through the conduit 2 to the upper inlet end of a rotary dryer such as the Hershey granulator 3. From the lower outlet end of the dryer, the sugar passes through the conduit 4 to the upper inlet end of a second rotary drum such as a Hershey granulator 5, which serves as a cooler and for further drying the granular sugar. From the lower discharge end of the cooler 5, the dried and cooled granular sugar passes over a scalping screen such as a 10-mesh screen (not shown) to remove oversize granules, and then through the spout 6 to a pulverizer shown conventionally as a micropulverizer 7 for converting the granular sugar into a finely divided pulverulent product, the pulverized product, when of sufficient fineness, being discharged by an air current entering at 8, which carries the sugar through the line indicated conventionally at 9, to a storage bin 10, from which the product can be passed to packaging equipment.

At the lower outlet end of the dryer 3, provision is made for introducing hot air, the air being preheated, e.g., to around 275° F., by passing over steam heated coils 11. From the upper end of the dryer, air is discharged through the outlet pipe 12, and circulation of air is effected by the blower 13.

The lower Hershey granulator or cooler has provision for the introduction of cool air, e.g., at around 80° F., at 14, and the air is discharged from the cooler through the outlet 15, with circulation effected by the fan 16.

In such an apparatus, the brown sugar in its normal granular form is introduced and is dried by the hot air while it is agitated and kept in granular form, and the hot dried sugar is discharged from the lower end of the dryer to the upper end of the cooling drum, where it is kept in agitation and subjected to the action of cool air to cool the dried sugar, and to accomplish further drying if the sugar has not been sufficiently dried in the dryer section so that the product discharged from the cooler is a dried and cooled granular product ready, after screening to remove oversize granules, to be sent to the pulverizer for pulverizing to form the new powdered brown sugar product.

The carrying out of the process in the apparatus thus described is illustrated by the following examples:

*Example 5.*—In an apparatus such as illustrated, one 100-pound bag of brown sugar was dumped every 90 seconds into the mixer and fed to the upper Hershey granulator or dryer. The feed rate was 4000 pounds of brown sugar per hour, with a moisture content of 2.53%, a percentage of invert of 3.08%, of ash 0.87%, of sucrose (polarization) of 91.55%, and undetermined, 1.97%.

Air was supplied to the dryer at a temperature of 275° F.

The hot dried sugar left the dryer at a temperature of 175°–180° F., and a moisture content of 0.5% to 0.7%.

In the cooler, the entering air had a temperature of 80° F. and the cooled sugar leaving the cooler had a temperature of 82° F. and the screened product, after removing oversize granules, had a moisture content of 0.25%.

The screened product was passed through a micropulverizer with a feed temperature of the sugar of 80° F., a discharge temperature of the sugar of 110° F., and the powdered product showed a moisture content of 0.49%. After 37 days of storage, the moisture content of the powdered product was 0.84%. The product showed a resistance to moisture by the above test of 120 minutes.

*Example 6.*—The brown sugar used had a sucrose content (polarization) of 87.85%, invert of 3.55%, moisture of 4.35%, ash of 1.19%, and undetermined 3.06%. To this sugar was added about 2% of starch, which was mixed with the sugar in the mixer. The operation was similar to that described in the preceding example, the feed rate being 4000 pounds per hour, the air temperature entering the dryer being 275° F. the dried sugar leaving the dryer at a temperature of 170°–180° F., and leaving the cooler at about 82° F. The moisture content of the product leaving the cooler, after screening to remove oversize, was about 0.21%.

The product was pulverized but was not tested for resistance to caking until 40 days later, when it showed a moisture content of 0.84% and a resistance to caking of 120 minutes.

In a similar manner, the brown sugar can be coated with confectioners' sugar, e.g., around 5% to 10% of 4X or 6X confectioners' sugar, before drying, and the coated brown sugar then subjected to drying and pulverizing to form a pulverized sugar product made up entirely of sugar. When powdered brown sugar, such as produced by the process of the present invention, is used instead of confectioners' sugar for coating the granular brown sugar before drying, the subsequent drying and pulverizing will give a powdered brown sugar made up entirely of brown sugar.

When the granular sugar is coated first with powdered sugar, such as confectioners' sugar or powdered brown sugar, and subsequently coated with a small amount of starch before drying, the drying will give a dry product having two added layers and the pulverizing of the dried product will give a powdered product containing both the added sugar and added starch but with the small amount of added starch so buried up in the pulverized product that it contains a characteristic brown sugar flavor and taste.

The drying of the granular brown sugar product before pulverizing should be carried to the extent where the sticky molasses film is converted into a dry, hard, solid, non-sticky coating. The drying of the brown sugar product should, in general, be carried to the point where the moisture content is less than about 1%, and advantageously a small fraction of 1%. The handling of the dried sugar, after screening to remove oversize, in transferring it to the pulverizer and during the pulverizing operation, and the subsequent handling of the pulverized product before packaging, may result in a somewhat increased moisture content in the pulverized product as compared with the dried granular product before pulverizing. As indicated in Example 4, products having a somewhat higher moisture content than 1% may, nevertheless, be highly stable against caking.

In my companion application, executed concurrently herewith, Serial No. 550,535, filed Dec. 2, 1955, I have described the production of a free flowing dry granular sugar product resistant to caking by adding to and coating granular brown sugar, or partially dried granular brown sugar, with a small amount of starch or of powdered white or brown sugar, and drying the coated sugar to convert the molasses coating into a dry solid brittle coating with the added starch or powdered sugar coating thereon and combined therewith. The coating method so described can be used in carrying out the first stage of the present process to produce a dried granular product which is subjected to pulverizing to form the new pulverized product of the present invention.

I claim:

1. The method of treating granular brown sugar having a molasses coating to produce therefrom a pulverulent brown sugar product which comprises drying granular brown sugar containing an excess of about 2.5% water in the molasses coating to convert the molasses layer thereon to a dry, solid, non-sticky coating, and to reduce the moisture content of the granular brown sugar to less than 1% and pulverizing the resulting dried product to produce a pulverulent product containing microscopic particles of the dried coating admixed with and surrounded by microscopic sucrose crystals resulting from the pulverizing operation.

2. The process of treating granular brown sugar having a molasses coating to produce therefrom a pulverulent sugar product which comprises passing the sugar containing in excess of about 2.5% water in the molasses coating continuously with agitation in contact with hot air to dry the brown sugar product to a moisture content of less than 1% and at a temperature at which the dried molasses coating is plastic, cooling the resulting hot brown sugar product to a temperature below about 82° F. by passing continuously with agitation in contact with cool air, carrying the drying operation to a point where the molasses coating is converted into a dry, solid, non-sticky coating, and with a moisture content of the dried granular sugar of less than 1%, and pulverizing the resulting dried product to form a pulverized product containing microscopic particles of the dried coating admixed with a much larger amount of microscopic sucrose particles resulting from the pulverizing of the dried brown sugar material.

3. A pulverized, dry, brown sugar product in a freely flowing form containing less than 1% of moisture and containing the sticky molasses coating of the undried brown sugar in the form of a dry, solid, non-sticky coating, such pulverized sugar product containing microscopic particles of the dry coating admixed with a large amount of microscopic sucrose crystal fragments produced by the pulverizing treatment.

References Cited in the file of this patent

UNITED STATES PATENTS

| 162,242 | Matthiessen | Apr. 20, 1875 |
| 195,591 | Elmenhorst | Sept. 25, 1877 |
| 2,400,292 | Dalton | May 14, 1946 |

OTHER REFERENCES

Ser. No. 356,560, Hara (A.P.C.), published May 11, 1943.